US009634945B2

(12) United States Patent
Stevens et al.

(10) Patent No.: US 9,634,945 B2
(45) Date of Patent: Apr. 25, 2017

(54) APPARATUS AND METHOD FOR STAGED TRAFFIC CLASSIFICATION AMONG TERMINAL AND AGGREGATION NODES OF A BROADBAND COMMUNICATIONS SYSTEM

(75) Inventors: Patrick Stevens, Mount Airy, MD (US); Robert Torres, New Market, MD (US); Douglas Dillon, Gaithersburg, MD (US); Greg Presbury, Hyattsville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 473 days.

(21) Appl. No.: 13/599,765

(22) Filed: Aug. 30, 2012

(65) Prior Publication Data
US 2014/0064080 A1 Mar. 6, 2014

(51) Int. Cl.
*H04L 12/851* (2013.01)
(52) U.S. Cl.
CPC ...... *H04L 47/2483* (2013.01); *H04L 47/2441* (2013.01)
(58) Field of Classification Search
CPC ............. H04L 47/2441; H04L 47/2483; H04L 12/2605; H04L 41/0816; H04L 41/0896; H04L 41/5022
USPC .. 370/229–231, 235, 253, 392, 395.21, 412, 370/468
See application file for complete search history.

(56) References Cited

U.S. PATENT DOCUMENTS

| 6,917,588 | B1* | 7/2005 | Cao et al. ................. 370/230.1 |
| 6,975,592 | B1 | 12/2005 | Seddigh et al. |
| 2002/0143939 | A1 | 10/2002 | Riddle et al. |
| 2002/0186661 | A1 | 12/2002 | Santiago et al. |
| 2003/0231594 | A1* | 12/2003 | Xu et al. ....................... 370/236 |
| 2004/0114518 | A1 | 6/2004 | MacFaden et al. |
| 2004/0213235 | A1 | 10/2004 | Marshall et al. |
| 2007/0076606 | A1* | 4/2007 | Olesinski ............ H04L 41/0893 370/230 |
| 2007/0192481 | A1 | 8/2007 | Wei et al. |

(Continued)

OTHER PUBLICATIONS

PCT/US13/57670 International Search Report and Written Opinion, Dec. 2, 2013.

(Continued)

*Primary Examiner* — Siming Liu
(74) *Attorney, Agent, or Firm* — Potomac Technology Law, LLC

(57) ABSTRACT

A system architecture and methods for data traffic flow classification are provided. An initial traffic class is assigned to a data flow as a current traffic classification, where the initial traffic class is based static traffic classification method(s) applied with respect to an initial packet of the data flow. A predetermined number of further packets of the data flow, subsequent to the initial packet, are analyzed based on predetermined factor(s), and a traffic class based on the analysis of the further packets is determined. The traffic class based on the analysis of the further packets is assigned as the current traffic classification of the data flow. Data indicating a traffic class for the data flow (based on a dynamic traffic classification method) is received, and the traffic class based on the dynamic traffic classification method is assigned as the current traffic classification of the data flow.

22 Claims, 7 Drawing Sheets

(56) References Cited

U.S. PATENT DOCUMENTS

| | | |
|---|---|---|
| 2008/0126556 A1 | 5/2008 | Perng et al. |
| 2010/0278190 A1* | 11/2010 | Yip et al. ................... 370/412 |
| 2011/0158124 A1 | 6/2011 | Frailong et al. |
| 2012/0039332 A1 | 2/2012 | Jackowski et al. |
| 2012/0051219 A1 | 3/2012 | Hart |
| 2012/0054363 A1* | 3/2012 | Hart ............................ 709/232 |
| 2012/0144025 A1* | 6/2012 | Melander ............ H04L 47/2441 |
| | | 709/224 |
| 2013/0083806 A1* | 4/2013 | Suarez Fuentes et al. ... 370/465 |

OTHER PUBLICATIONS

Cascarano, Niccolo, "Application Layer Traffic Classification", http://netgrou.polito.it/Members/niccolo_cascarano/pub/tesi.pdf, Nov. 1, 2007.

Blake et al., "An architecture for differentiated services", article, Dec. 1998, pp. 1-36, The Internet Society.

Braden et al., "Integrated Services in the Internet Architecture: an Overview Status of this Memo", Article, Jul. 1994, 28 pages.

Lin et al., "Application classification using packet size distribution and port association", journal, Mar. 2009, pp. 1023-1030, Journal of Network and Computer Applications 32, www.elsevier.com/locate/jnca.

* cited by examiner

APPARATUS AND METHOD FOR STAGED TRAFFIC CLASSIFICATION AMONG TERMINAL AND AGGREGATION NODES OF A BROADBAND COMMUNICATIONS SYSTEM

BACKGROUND

The present invention relates to data traffic classification within a broadband communications network, and more specifically to a staged traffic classification mechanism for dynamic adjustment of traffic classification at different stages of a data traffic flow.

As society, in general, becomes increasingly reliant on data communications networks to conduct a variety of business activities, including business communications (e.g., email, teleconferencing, video conferencing, e-meetings, voice/video over IP, etc.), business transactions (e.g., corroborative document drafting via e-meeting or video conference) and other business activities, as well as personal activities, including personal communications (e.g., email, voice/video over IP, social networking, etc.) and entertainment (e.g., multimedia streaming, on-line gaming, multimedia sharing, etc.), QoS and other bandwidth requirements become increasingly significant. Moreover, this growing base of consumer and business activities via data communications networks drives an increasing diversity of applications being used in a typical data network. Also, as capacity requirements of different users (and for that matter of the same users) fluctuate depending on time day and types of applications in use, the accuracy of traffic forecasts is diminished, and inaccurate forecasts can lead to negative effects, such as traffic congestion, slow response times, or even data loss. Accordingly, communication engineers continually face the challenges of optimizing use of network capacity and ensuring reliable bandwidth availability to a diverse set of users with varying traffic requirements.

Moreover, modern satellite communications systems provide an accessible, pervasive and reliable communications network for supporting a variety of data communications, such as voice, video, and data traffic. These satellite communications systems have emerged as a viable option to terrestrial communications systems, particularly in the arena of Internet access and business or corporate networking. As such, satellite systems become increasingly relied on for corporate networking and business and personal internet access, and as the popularity of the Internet continues to grow in unparalleled fashion, the communications industry has focused on improving user response time, and bandwidth and QoS guarantees. Additionally, although satellite based communications services address the problems of providing universal Internet access and other communications services, in that satellite coverage areas are not hindered by traditional terrestrial infrastructure obstacles, the deployment of satellite based access services is tempered by the challenges of minimizing delay and increasing throughput in a bandwidth constrained system. Further, satisfying QoS and other bandwidth requirements over such bandwidth constrained systems introduces additional challenges.

For example, in a shared bandwidth network with multiple remote nodes, where multiple remote nodes access public and/or remote private networks (e.g., the Internet and remote corporate networks) through one or more aggregation nodes, where quality of service is required on every link of the network in each direction (e.g., on an application-specific or communications session-specific basis), unique challenges are presented with respect to early and accurate traffic classification to meet the QoS requirements. Particularly, considering various factors existing with current applications in a network environment, it is difficult to efficiently and accurately associate packets of a traffic flow with the respective application or communications sessions for appropriate quality of service handling. Such factors include the diversity of applications in use in a typical network, the inability to trust the end user computing platform, the disguising of peer to peer traffic on known traffic ports, and the quickness in the change of application signatures. For example, it is difficult to utilize existing DiffServ and IntServ methods for flow classification, to provide users with a good experience that prioritizes interactive and conversational traffic over traffic classes such as streaming and bulk, to keep up with the changes in application signatures to continue to make the proper packet classification decisions, to provide a cost effective solution at smaller, less expensive remote network nodes, and to make timely decisions such that sessions are not delayed by the classification process. Further, while various solutions exist that may satisfy some of the requirements, engineers have yet to develop a solution that addresses all such requirements.

There are a number of network services that require packet classification, such as routing, access-control in firewalls, policy-based routing, provision of differentiated qualities of service, and traffic billing. Further, the increasing use of the Internet for consumer applications with real-time constraints (e.g., media streaming, gaming, video calls, etc.), and for business and commercial purposes, introduces an economic incentive for providing service differentiation to meet respective QoS requirements and improve the customer experience. In order to provide for such service and application differentiation, it becomes necessary to determine the session with which an arriving packet is associated, in order to determine appropriate handling for the packet (e.g., priority or what class of service it should receive—QoS). In order to best satisfy such QoS requirements, it becomes important and more efficient to classify data packets of a particular application or communications session as early as possible in the pendency of the session. When looking at data traffic in today's communication networks (e.g., the Internet), a predominant amount of the source data connections or sessions originate at the user device (e.g., a user PC or other type of user terminal). The traffic classification, therefore, ideally must start at the network node of such user terminal devices. Current routers, for example, may perform a static traffic classification based on information within the TCP or UDP header of an IP packet (e.g., a port-based classification based on a port identifier of the header). A problem arises, however, in that there is a large realm of applications that tend to transmit data traffic via dynamic or ephemeral ports. In addition, a large number of applications tend to reuse existing ports (traditionally used for well-known applications) for other applications that behave differently than the well-known applications that traditionally use such ports (e.g., cloud backup over port 443 and video streaming over port 80). In such cases, a terminal may not know via which port data packets of such an application will arrive, and thus a static traffic classification generally will be unreliable or inaccurate.

Further, various network devices exist which are capable of performing a deep packet inspection (DPI) for traffic classification. Such DPI devices, however, require relatively extensive processing power and complex processing capabilities (e.g., hardware assists) in order to analyze the payload of a data packet to accurately determine the appropriate traffic classification. Such devices, however, are relatively large and expensive, and thus it becomes impractical to deploy such devices at the terminal nodes, where a session originates. Instead, such devices are accordingly deployed at data centers and network hubs, where they enable a service provider to perform traffic classification and prioritization, and even traffic shaping, for the service provider network. Being deployed at the data centers and network hubs, however, renders such DPI devices ineffective at providing a classification function at the early stages of a session.

What is needed, therefore, is a system and method to address the challenges of providing for traffic classification at the early stages of an application or communications session to achieve efficient, robust, reliable and flexible broadband services, which meet QoS and other bandwidth requirements, in such shared bandwidth networks.

SOME EXEMPLARY EMBODIMENTS

The present invention advantageously addresses the foregoing requirements and needs, as well as others, by providing a system architecture and methods for data traffic classification, which meets QoS and other bandwidth requirements, providing for efficient, robust, reliable and flexible broadband services in broadband communications systems.

According, to exemplary embodiments, the present systems and methods for traffic classification address the various issues in current systems by providing for a relatively immediate initial classification of data traffic within a traffic flow using multi-field (MF) and DiffServ classification techniques at the remote node of the communications network, at which a traffic flow or data communication is initiated. For example, according to one exemplary embodiment, the remote node sets a traffic classification or priority based on information learned from a first number of packets of a session, and subsequently maintains or adjusts the classification based on receipt of classification signaling from an aggregation node based on a deep packet inspection (DPI) or signature matching. Accordingly, in the event that the subsequent classification signaling indicates a priority that differs from the priority for the classification assigned at the remote node based on the first number of packets, the priority for the data flow is adjusted accordingly. Additionally, according to further exemplary embodiments, the present systems and methods for data traffic classification handle such transitions in situations where the remote node and a further network node require coordination in the changing of the flow priorities, such as when the data flow is based on the TCP protocol, and the nodes are providing a Performance Enhancing Proxy (PEP) to accelerate the traffic of the data flow.

As such, in accordance with exemplary embodiments, the present invention leverages technologies available at remote nodes to implement data traffic classification, where it is not practical or cost-effective to deploy the specialized hardware and software required to perform deep packet inspection for traffic classification. Further, multiple methods of classification are utilized to determine the best method of QoS handling for a packet. Additionally the architecture and methods of exemplary embodiments facilitate upshifts and downshifts of the priority over the pendency of an application or communications session, and thereby optimizing the latency of the decision on the early packets of the session, while utilizing the information from a deep packet inspection, when available.

According to an exemplary embodiment, a method comprises assigning an initial traffic class as a current traffic classification of a data flow of a communications network, wherein the initial traffic class is based on one or more static traffic classification methods applied with respect to an initial packet of the data flow, analyzing a predetermined number of further packets of the data flow, subsequent to the initial packet, based on one or more predetermined factors, and determining a traffic class based on the analysis of the further packets, and assigning the traffic class based on the analysis of the further packets as the current traffic classification of the data flow. According to a further exemplary embodiment, the traffic class determined based on the analysis of the further packets is assigned as the current traffic classification of the data flow only if the traffic class determined based on the analysis of the further packets differs from the initial traffic class. According to a further exemplary embodiment, when the traffic class determined based on the analysis of the further packets differs from the initial traffic class, the traffic class determined based on the analysis of the further packets is assigned as the current traffic classification of the data flow only if it reflects a higher priority classification as compared to the initial traffic class. According to a further exemplary embodiment, the method further includes determining whether the traffic class determined based on the analysis of the further packets reflects a more accurate classification as compared to the initial traffic class, wherein the traffic class determined based on the analysis of the further packets is assigned as the current traffic classification of the data flow only if it is determined as being a more accurate classification as compared to the initial traffic class. According to a further exemplary embodiment, the method further comprises receiving data indicating a traffic class for the data flow, wherein the traffic class is based on a dynamic traffic classification method (e.g., a deep packet inspection (DPI) classification method), and assigning the traffic class based on the dynamic traffic classification method as the current traffic classification of the data flow.

According to an exemplary embodiment, an apparatus comprises at least one processor, and at least one memory including computer program code for one or more programs, the at least one memory and the computer program code configured to, with the at least one processor, cause the apparatus to perform at least the following functions. The apparatus assigns an initial traffic class as a current traffic classification of a data flow received by the apparatus, wherein the initial traffic class is based on one or more static traffic classification methods applied with respect to an initial packet of the data flow. The apparatus analyzes a predetermined number of further packets of the data flow, subsequent to the initial packet, based on one or more predetermined factors, and determines a traffic class based on the analysis of the further packets, and assigns the traffic class based on the analysis of the further packets as the current traffic classification of the data flow. According to a further exemplary embodiment, the traffic class determined based on the analysis of the further packets is assigned as the current traffic classification of the data flow only if the traffic class determined based on the analysis of the further packets differs from the initial traffic class. According to a further exemplary embodiment, when the traffic class determined based on the analysis of the further packets differs from the initial traffic class, the traffic class determined based on the analysis of the further packets is assigned as the current traffic classification of the data flow only if it reflects a higher priority classification as compared to the initial traffic class. According to a further exemplary embodiment, the apparatus further determines whether the traffic class determined based on the analysis of the further packets reflects a more accurate classification as compared to the initial traffic class, wherein the traffic class determined based on the analysis of the further packets is assigned as the current traffic classification of the data flow only if it is determined as being a more accurate classification as compared to the initial traffic class. According to a further exemplary embodiment, the apparatus further receives data indicating a traffic class for the data flow, wherein the traffic class is based on a dynamic traffic classification method (e.g., a deep packet inspection (DPI) traffic classification method), and assigns the traffic class based on the dynamic traffic classification method as the current traffic classification of the data flow.

According to a further exemplary embodiment, a computer-readable storage medium carrying one or more sequences of one or more instructions, which, when executed by one or more processors, cause an apparatus to at least perform the following: Assigning an initial traffic class as a current traffic classification of a data flow of a communications network, wherein the initial traffic class is based on one or more static traffic classification methods applied with respect to an initial packet of the data flow, analyzing a predetermined number of further packets of the data flow, subsequent to the initial packet, based on one or more predetermined factors, and determining a traffic class based on the analysis of the further packets, and assigning the traffic class based on the analysis of the further packets as the current traffic classification of the data flow. According to a further exemplary embodiment, the traffic class determined based on the analysis of the further packets is assigned as the current traffic classification of the data flow only if the traffic class determined based on the analysis of the further packets differs from the initial traffic class. According to a further exemplary embodiment, when the traffic class determined based on the analysis of the further packets differs from the initial traffic class, the traffic class determined based on the analysis of the further packets is assigned as the current traffic classification of the data flow only if it reflects a higher priority classification as compared to the initial traffic class. According to a further exemplary embodiment, the apparatus is further caused to perform a determination whether the traffic class determined based on the analysis of the further packets reflects a more accurate classification as compared to the initial traffic class, wherein the traffic class determined based on the analysis of the further packets is assigned as the current traffic classification of the data flow only if it is determined as being a more accurate classification as compared to the initial traffic class. According to a further exemplary embodiment, data indicating a traffic class for the data flow is received, wherein the traffic class is based on a dynamic traffic classification method (e.g., a deep packet inspection (DPI) classification method), and assigning the traffic class based on the dynamic traffic classification method as the current traffic classification of the data flow.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
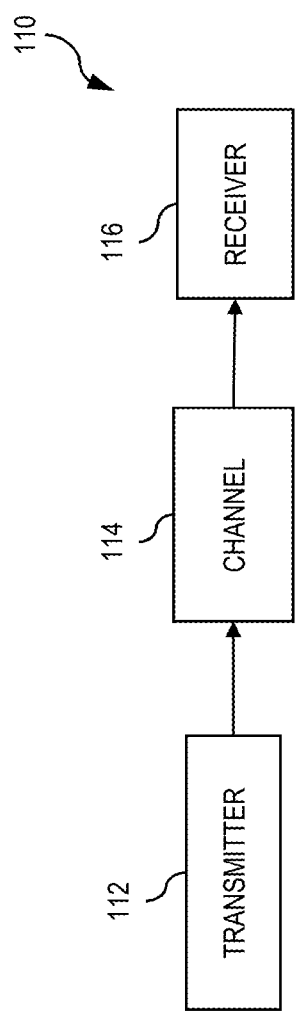
FIGS. 1A, 1B and 1C illustrate communications systems capable of employing a multi-stage traffic classification process, in accordance with exemplary embodiments.

A system architecture and methods for data traffic (flow) classification, which meet QoS and other bandwidth requirements, providing for efficient, robust, reliable and flexible broadband services in broadband communications systems, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

In a shared bandwidth communications network, for example, where multiple remote nodes access public and/or remote private networks (e.g., the Internet and remote corporate networks) through one or more aggregation nodes (e.g., gateways), according to various exemplary embodiments, the present architecture and methods for data flow classification satisfy QoS and other bandwidth requirements, providing for the provision of efficient, robust, reliable and flexible broadband services in such broadband communications systems. While devices exist that have the capability of performing deep packet inspection at high speeds (while staying up to date with the most recent signatures), there is a class of devices for which deep packet inspection is either not possible, cost prohibitive, or technically impractical. Unfortunately, often the class of devices for which deep packet inspection is not feasible are deployed at locations of the network where traffic prioritization and/or policing is required (e.g., at the terminal nodes), and the devices that perform the deep packet inspection generally cannot economically be located where the prioritization and/or policing needs to occur. The solution in accordance with exemplary embodiments, however, addresses the requirements for traffic classification at remote terminal nodes by first classifying the flow initially using multi-field (MF) and DiffServ classification methods at the remote node, evaluating and accordingly setting the flow priority based on subsequent information learned from a first predetermined number packets of the flow, and finally, based on a deep packet signature matching process, receiving signaling from an aggregation node (e.g., the gateway) and potentially modifying the classification and priority handling of the flow, accordingly.

Accordingly, in accordance with exemplary embodiments, the present invention provides for setting an initial traffic classification and priority handling for a traffic flow, and for updating the classification and priority handling of the traffic flow based on information subsequently received from a remote deep packet inspection device. By way of example, a traffic flow, in the context of embodiments of the present invention, generally comprises packets temporally related based on a combination of one or more of the following fields present in the IP and/or transport headers of the packets in the flow: source IP address; destination IP address; protocol; source TCP/UDP port; and destination TCP/UDP port. In certain protocols, a traffic flow is explicitly started and ended by control packets, such as the TCP SYN and TCP FIN or TCP RST in TCP flows. The deep packet inspection capabilities of the gateway are thereby utilized by a remote terminal node (e.g., an ST), which does not have deep packet inspection capabilities, such that the remote terminal device can make classification and policing decisions based upon the information learned from the deep packet inspection device without adding latency to the traffic. Additionally, the transition in traffic classification and priority handling can be accomplished even when the remote node and another network node require coordination in the changing of the flow priority such as when the flow is TCP and the nodes are providing a Performance Enhancing Proxy (PEP) for the traffic. Specifically, the architecture and methods, according to exemplary embodiments of the present invention, provide for multi-stage classification, where changes to priority and/or handling of a traffic flow may occur multiple times based upon different information learned at different stages of the flow (e.g., multi-stage traffic classification). The remote terminal nodes thereby leverage deep packet inspection devices deployed at gateway nodes of the network, for example, receiving industry standard signaling from a respective deep packet inspection device, and adjusting classification, priority and local handling of a data flow in progress, based upon the industry standard signaling. Further, coordination between nodes of the network may be employed to ensure that the classification, priority and handling of the flow are appropriately employed throughout the network. Traffic classification and priority handling are thereby initiated at the start of a traffic flow, expediting proper handling of the data packets of a traffic flow, and improving QoS and bandwidth performance for the traffic flow. Moreover, the capabilities herein described apply to any data transport system requiring quality of service and/or traffic shaping, where not all nodes of the network support complex deep packet inspection functions.

In accordance with an exemplary embodiment, a shared bandwidth broadband communications system comprises a broadband satellite communications system, where multiple remote nodes (e.g., satellite terminals (STs)) access broadband services through one or more aggregation nodes (e.g., gateways (GWs) or IP gateways (IPGWs). For instance, different STs subscribe to different services, whereby the STs associate with respective IPGWs that support the respective services of the terminal. An ST would dynamically select an IPGW from an eligible pool of IPGWs that support service configurations and subscriptions that satisfy the service requirements of the ST. The ST associates with the selected IPGW for provision of the required services to the terminal. Once the ST completes an association process, and the IPGW accepts the association, the terminal becomes associated with the selected IPGW. Once associated with an IPGW, an ST transmits and receives its communications service traffic (e.g., user data traffic) over the communications system via the associated IPGW.

Figure 1B:
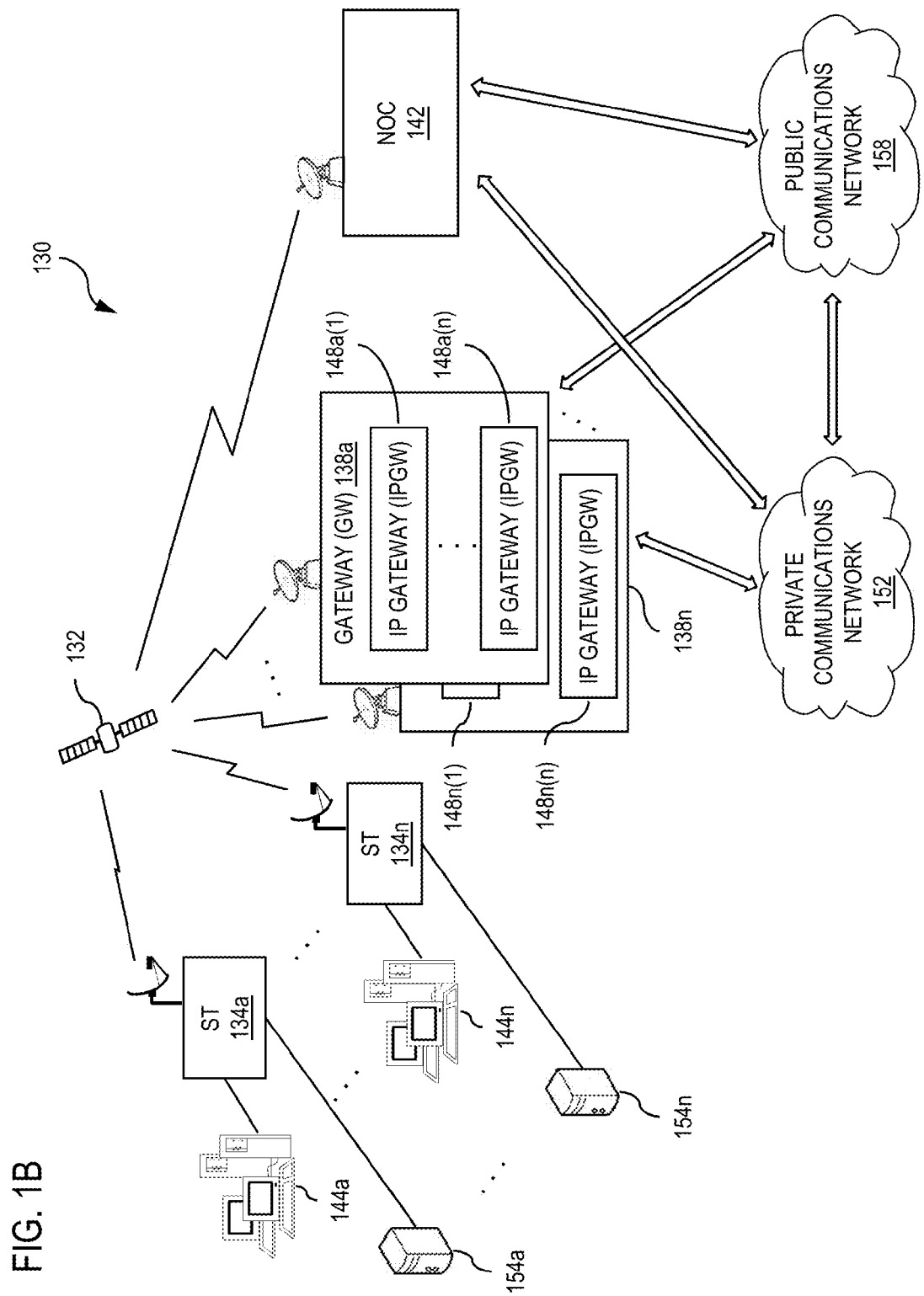
Figure 1C:
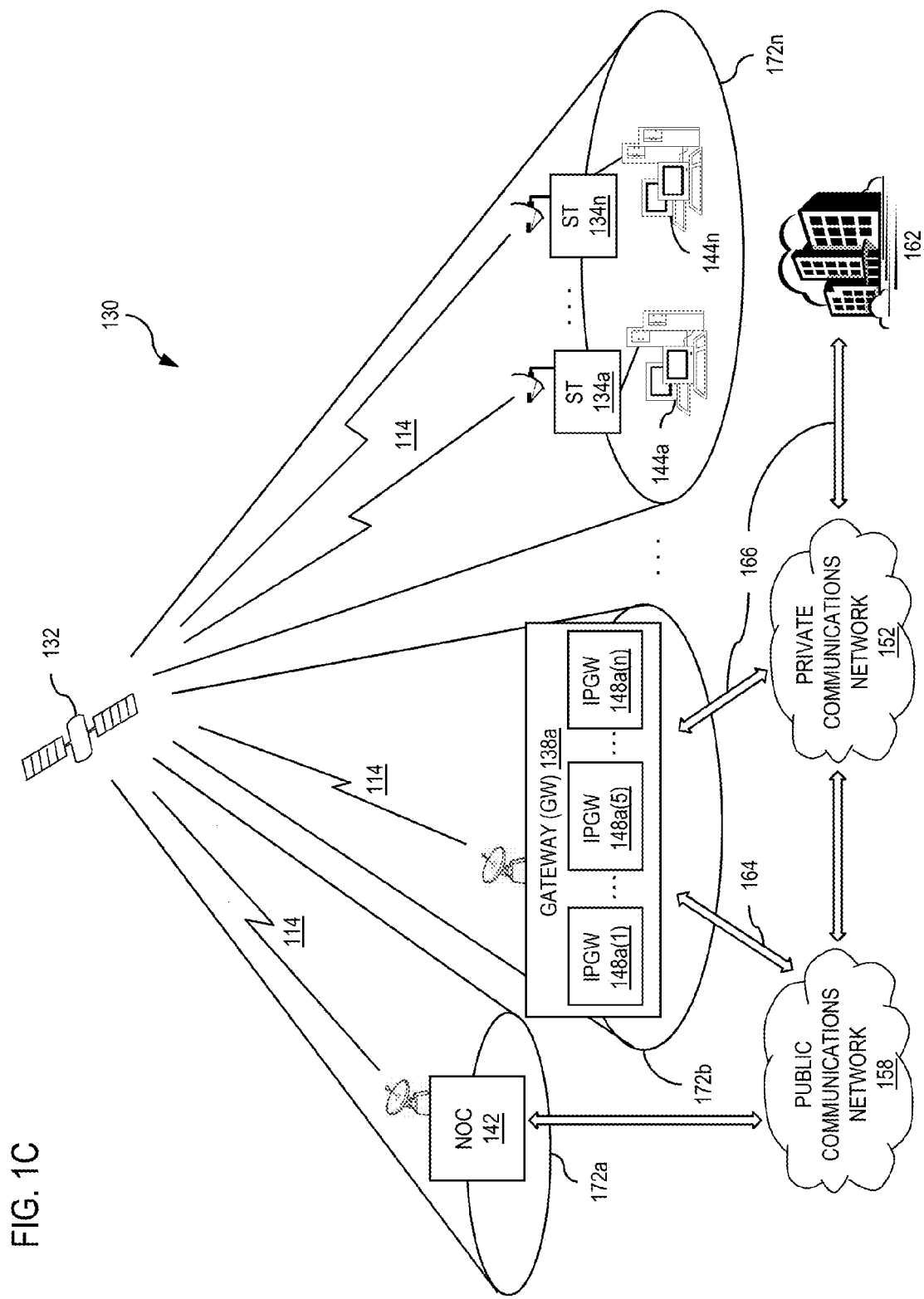

FIGS. 1A-1C illustrate communications systems capable of employing a process for data traffic (flow) classification, which meet QoS and other bandwidth requirements, providing for efficient, robust, reliable and flexible broadband services, according to various exemplary embodiments. With reference to FIG. 1A, a broadband communications system 110 includes one or more transmitters 112 (of which one is shown) that generate signal waveforms across a communications channel 114 to one or more receivers 116 (of which one is shown). In this discrete communications system 110, the transmitter 112 has a signal source that produces a discrete set of data signals, where each of the data signals has a corresponding signal waveform. These signal waveforms are attenuated, or otherwise altered, by communications channel 114. Coding may be utilized to combat noise and other issues associated with the channel 114, such as forward error correction (FEC) codes.

FIG. 1B illustrates an exemplary satellite communications system 130 capable of supporting communications among terminals with varied capabilities, according to exemplary embodiments. Satellite communications system 130 includes a satellite 132 that supports communications among multiple satellite terminals (STs) 134a-134n, a number of gateways (GWs) 138a-138n, and a network operations center (NOC) 142. According to different embodiments, the NOC 142 may reside at a separate site reachable via a separate satellite channel or may reside within a GW site. The NOC 142 performs the management plane functions of the system 130, while the GWs 138a-138n perform the data plane functions of the system 133. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one exemplary embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further exemplary embodiment, each of the GWs 138a-138n include one or more IP gateways (IPGWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134a and 134n).

In a bent-pipe system of an exemplary embodiment, the satellite 132 operates as a repeater or bent pipe, and communications to and from the STs 134a-134n are transmitted over the satellite 132 to and from respective IPGWs associated with particular STs. Further, in a spot beam system, any one spot beam (e.g., beams 172a-172n) operates as a bent-pipe to geographic region covered by the beam. For example, each spot beam operates as a bent pipe communications channel to and from the STs and/or IPGW(s) within the geographic region covered by the beam. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1C, for example, for a data communication from ST 134a to a public communications network 158 (e.g., the Internet), the ST 134a is associated with an IPGW (e.g., IPGW 148a(1)—selected from a pool of IPGWs available to the ST 134a, such as IPGWs 148a(1)-148a(5 )—where the pool of IPGWs is a suitable subset of the IPGWs 148a(1)-148a(n) located at the GW 138a). The data is first transmitted, via the satellite 132, from the ST 134a to associated IPGW 148a(1). The IPGW 148a(1) determines the destination as being the Internet 158. The IPGW then repackages the data (e.g., as a TCP/IP communication), and routes the data communication, via the terrestrial link 164, to the Internet 158. Further, in a corporate network, for example, a corporation may deploy various remote STs at remote offices. More specifically, ST 134n, located at a remote corporate location, may desire to securely communicate with the corporate headquarters 162. Accordingly, for a data communication from ST 134n to the corporate headquarters 162, the data is first transmitted, via the satellite 132, from the ST 134n to an IPGW associated with the ST 134n (e.g., IPGW 148a(5)). The IPGW 148a(5) determines the destination as being the corporate headquarters 162. The IPGW then repackages the data (e.g., as an IPsec communication), and routes the IPsec data communication, via the secure terrestrial links 166 (over the private network 152), to the corporate headquarters 162. In the corporate network scenario, a further example involves a corporate communications from the corporate headquarters to a number of remote sites (e.g., a multicast communication to STs 134a-134n)—where STs 134a-134n are correspondingly associated with the two IPGWs 148a(1) and 148a(5) (e.g., grouped between the two IPGWs based on load balancing and IPGW capabilities). In this scenario, a gateway or router, within the local network of corporate headquarters 162, transmits the data communication, via the secure terrestrial links 166 (over the private network 152), to the IPGWs 148a(1) and 148a( 5). The IPGWs determine that the communication is destined for the remote STs 134a-134n, and package the data as a multicast communication addressed to the community of STs 134a-134n. The IPGWs then transmit the data communication, via the satellite 132, for decoding by the community of STs 134a-134n. Accordingly, the satellite of such a system acts as a bent pipe or repeater, transmitting communications between the STs 134a-134n and their respective associated IPGWs 148a-148n.

For traffic management in such a system, one of the most critical elements for service differentiation is the identification and mapping of ingress traffic to a traffic class best suited to support respective quality of service (QoS) requirements. Mechanisms for service differentiation in packet data networks (e.g., the Internet) rely on packet classification. Further, for improved efficiency, such traffic classification should be employed, in a practical and expeditious manner, at the early stages of a traffic flow, such as at a terminal node where the traffic flow originates. Additionally, traffic classification methods may also be employed to identify flows that are to be mapped to special process functions, such as TCP performance enhancing proxies, packet drop, header compression, etc.

Figure 2:
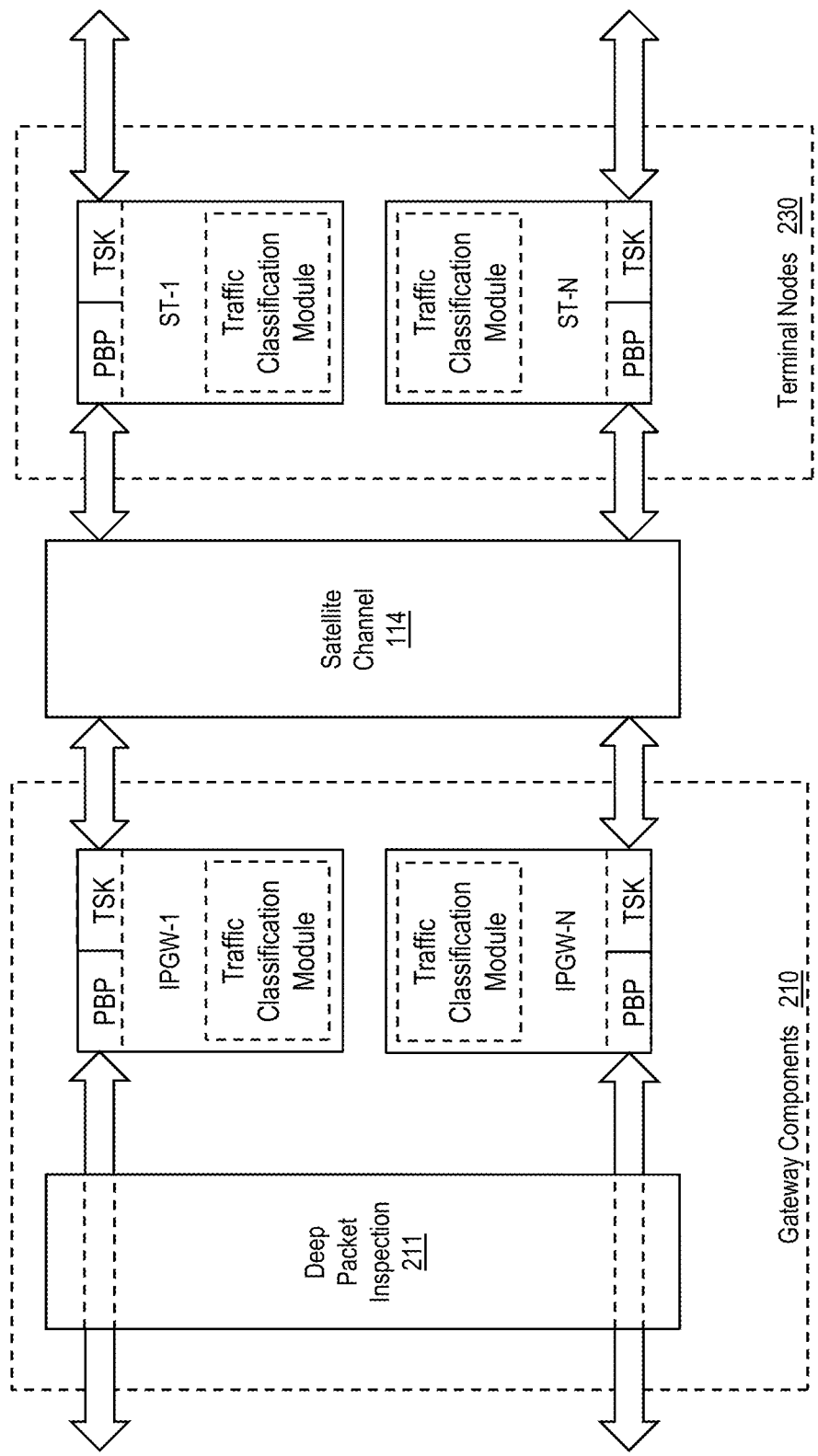
FIG. 2 illustrates a block diagram reflecting the traffic management architecture, an accordance with exemplary embodiments.

FIG. 2 illustrates a block diagram reflecting the traffic management architecture, in accordance with exemplary embodiments. As illustrated in FIG. 2, the gateway components 210 include the DPI device 211 and the IPGWs (IPGW-A to IPGW-N). Each IPGW includes a traffic classification module, which may be configured to perform one or more static traffic classification processes (e.g., MF classification and/or DiffServ traffic classification). Although the gateway components 210 are illustrated as being within a single dotted box, it will be appreciated that the components may, but need not, be housed in a single unit (e.g., server or chassis), or located at a single site. The terminal nodes comprise the terminals (ST-1 to ST-N), where (as with the IPGWs) each ST includes a traffic classification module, which may similarly be configured to perform one or more static traffic classification processes (e.g., MF classification and/or DiffServ traffic classification). According to the embodiment depicted in FIG. 2, the ST-1 is associated with the IPGW-1 and the ST-N is associated with the IPGW-N. Accordingly, with respect to a TCP spoofed connection via the ST-1, a data flow coming into the ST (e.g., from a host computer) is received by a TCP spoofing kernel (TSK), and processed and transmitted to the IPGW-1 via the satellite channel 114 over a PEP backbone connection (PBP). The IPGW-1 receives the data flow via a TSK, and transmits the data flow on over a PBP. The DPI device 211, and the traffic classification modules of the ST-1 and the IPGW-1, analyze and classify/reclassify the data flow (as further described below). Similarly, the data flows with respect to the ST-n and the IPGW-N function in an analogous manner.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components.

Figure 5:
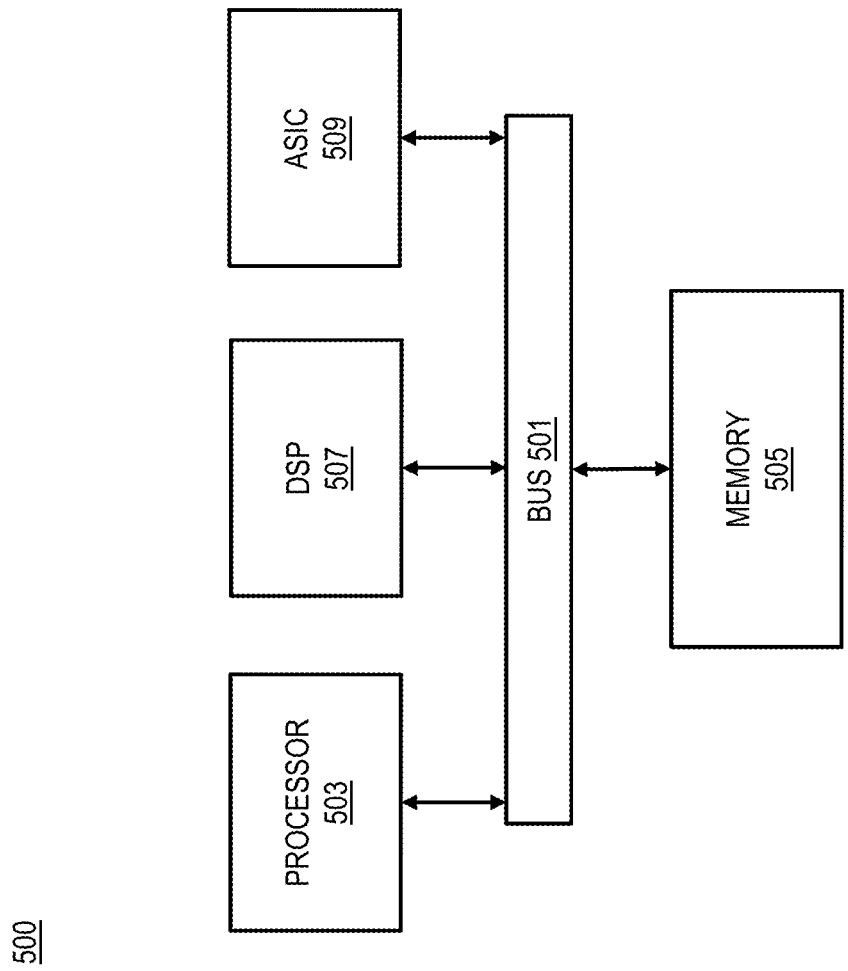
FIG. 5 is a diagram of a chip set that can be utilized in implementing multi-stage traffic classification, according to exemplary embodiments.

Further, a system architecture and methods for data traffic (flow) classification, according to exemplary embodiments of the present invention, may be implemented, at least in part, by one or more chip sets, including one or more processors and memory, as illustrated in FIG. 5 (showing one such processor). The chip set 500, for example, is incorporated into the STs and/or GWs/IPGWs, and as such, the chip set 500 provides a means for accomplishing various parts of the algorithms and protocols herein described and illustrated. Further, different aspects of such algorithms and protocols may be allocated to the components of the chip set, as would be prudent based on design choices that would be apparent to one of skill in the art.

Figure 3:
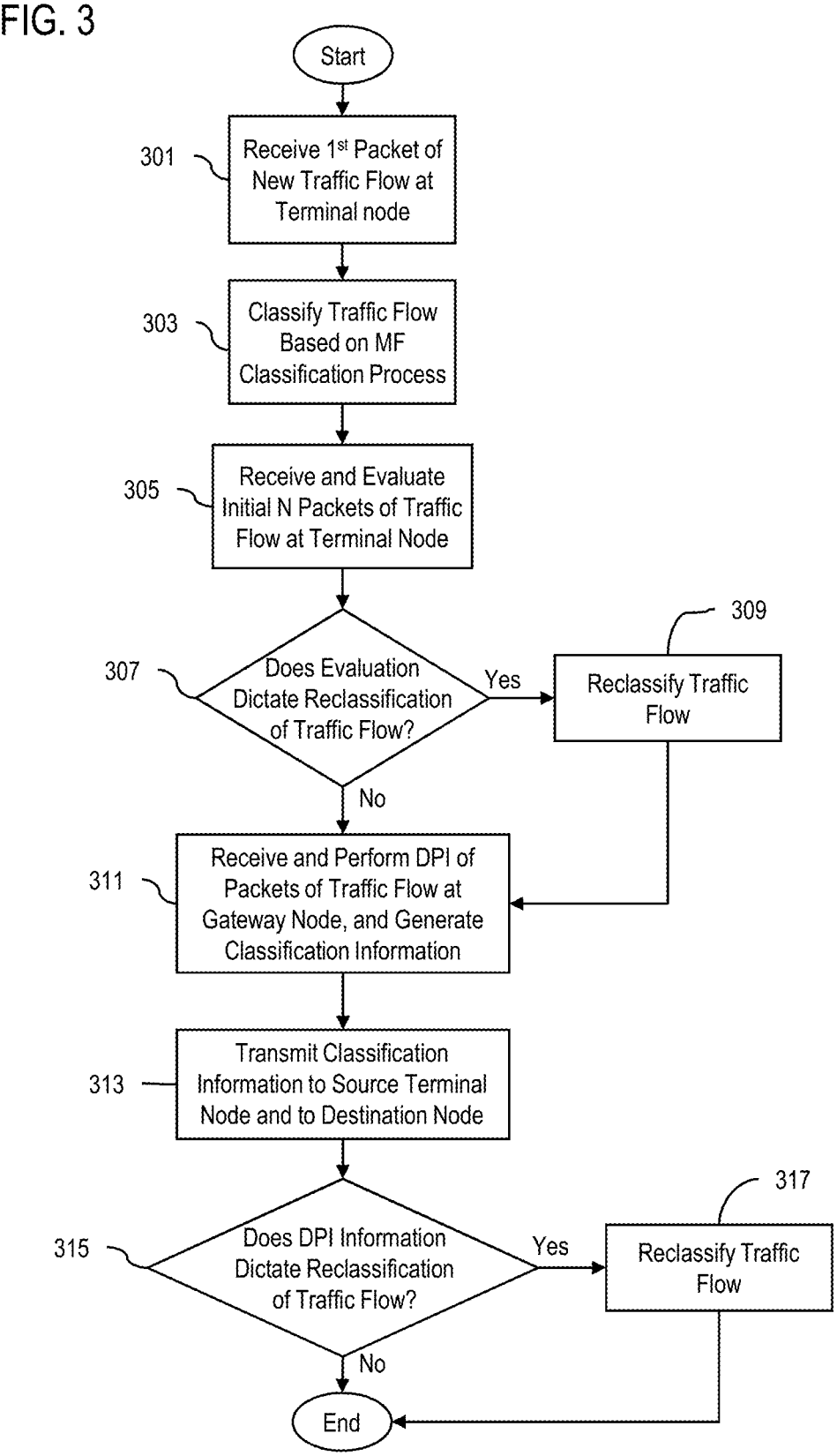
FIG. 3 illustrates a flow chart reflecting a multi-stage traffic classification process, in accordance with an exemplary embodiment.

FIG. 3 illustrates a flow chart reflecting a multi-stage traffic classification process, in accordance with an exemplary embodiment. At step 301, a first packet of a new traffic flow is received at a terminal node (i.e., a first stage of the flow), for example, from an end user application. Upon receipt of the packet, an initial traffic classification process is employed, for example, using a multi-field (MF) packet analysis and classification method (Step 303). Further, in the event that a reliable DSCP value is available, a DiffServ classification method may be employed as an alternative, or in addition, to the MF classification. According to a further exemplary embodiment, where there are multiple hops prior to an initial packet reaching an aggregation node with DPI capabilities (described in further detail below), the routers or other devices at the intermediary nodes may perform their own MF classification based on the same classification rules deployed at the initial terminal node. Alternatively, the initial terminal node may communicate its initial traffic classification assignment to such other intermediary nodes. Accordingly, the initial packets would thus receive consistent priority treatment based on the first stage classification (e.g., the static classification based on a multi-field classification process). Similarly, with respect to traffic flows, associated with the same application or session, traveling in the opposite direction from the destination terminal node back to the originating terminal node, the destination terminal node (and any intermediate nodes) may perform a similar MF classification process for the flow management of the return data flow.

According to an exemplary embodiment, the initial MF packet classification involves matching multiple packet header fields (multi-field) against a set of filters for identifying a respective traffic class. For example, a set of static classification rules are preferably specified for both directions of traffic flow (e.g., for the inroute and outroute of a terminal node). The static MF classification rules may be configured locally via a terminal node management component or remotely via a network management system, and are configured in an order of precedence by which they are applied by the IPGW or terminal node. The management component or system also configures a default classification rule for the treatment of a new flow where the initial packets do not match any of the other configured classification rules. Each classification rule specifies one or more of values, ranges and a wildcard associated with meaningful combinations of respective fields of the protocol headers. Such respective protocol headers may include one or more of IP protocol version (IPv4/IPv6), source and/or destination IP address, protocol ID, type of service (TOS)/differentiated services code point (DSCP) bits, flow label (IPv6), and UDP/TCP source and/or destination port numbers. The IPv4/IPv6 network protocol header, and the UDP/TCP transport protocol header, of the initial packet of a traffic flow are analyzed, and, the respective traffic flow is classified based upon an application of predetermined classification rules or filters to respective fields of the protocol headers. The classification is based on flows, rather than on a packet by packet basis, to achieve a consistent classification of the native application of the flow and to avoid unnecessary packet re-ordering. Based on the application of the classification rules or filters with respect to the respective protocol header fields, a classification determination is made. MF classification processes are further described in the Internet Engineering Task Force (IETF) publication IETF RFC1633, incorporated herein by reference in its entirety.

The originating terminal node and the IPGW maintain a classification state associated with the traffic flows based on the MF classification determinations of the terminal node. If there is no classification state (e.g., no pre-existing flow) and the IPGW or terminal receives an IP packet, it performs a search with its configured MF classification rules and records the M-tuple of that flow as part of the state of this new flow. The matching MF classification rule specifies the traffic class of this flow. The IPGW or terminal removes the classification state of a given flow using one of two possible mechanisms. According to one mechanism, if the flow is part of a TCP spoofed session, then the detection of an abortive disconnect (e.g., RST segment) or a graceful disconnect (e.g., FIN segment) signals that the completion of the associated TCP connection and that the classification state associated with that TCP connection can be removed. Alternatively, if the flow is not part of a TCP spoofed session, then the classification state cleanup may be based upon a timeout mechanism. For example, if packets that match the classification state are not received prior to the expiration of a timer, then the classification state associated with that connection can be removed. Otherwise, if packets that match the classification state are received prior to the expiration of the timer, then the timer is reset.

With respect to MF classification, operationally, various data protocols exist which have well known header values respecting which MF classification rules can be configured to capture appropriate classification and priority handling. For example, various file transfer protocols exist, which have well known N-tuple values, respecting which an associated MF classification rule could be configured to map associated data flows to a background traffic class or non-real-time or non-interactive traffic class. Examples of such data protocols include file transfer protocol (FTP), and secure shell protocol (SSH) or secure copy protocol (SCP). Additionally, protocols such as real-time messaging protocol (RTMP) exist, which can be recognized with static MF classifications rules and mapped to a system priority comparable to a streaming traffic class.

MF classification, however, suffers from certain disadvantages. For example, a large number of data protocols exist which cannot easily be classified using static MF classification rules. Among these are protocols that provide the feature of negotiating, at the start of the flow, for example, ephemeral port values to be used in the flow. For classification, such protocols would thus require a system implementation of an application level proxy feature, which would overly increase implementation complexities and costs. Further, additional protocols exist as part of Internet traffic, which, while conforming to TCP/IP standards as set forth in the IETF, utilize proprietary methods in higher layers of the protocols that are not conducive to using static MF classification rules to identify the traffic classes for the respective data flows. Such applications, therefore, would require the deployment of a deep packet inspection (DPI) device for accurate classification of the respective data flows—which, as specified above, is impractical at the terminal nodes where the initial classification is required. Further, an accurate assessment by a DPI engine deployed at a gateway node would require analysis of several round trip packets, which can introduce a delay in the traffic classification on the order of seconds, and an improper traffic classification (e.g., resulting in traffic handling at a lower priority level than required) can lead to perceived latency in the end user applications. Operationally, therefore, to satisfy the desire to minimize latency, the default MF classification rules may be set to map all unrecognized traffic to a high priority traffic class (e.g., interactive traffic, which is handled at a higher priority than streaming or background/bulk traffic). The result would be the classification of all new traffic flows that don't match a static classifier rule as interactive, unless and until they are re-classified using a DPI classification. Such a solution, however is impractical in a constrained bandwidth system (e.g., a wireless or satellite communications system), whereby the overly aggressive classification of traffic flows would unnecessarily consume system resources otherwise intended only for interactive traffic, which ultimately could result in system congestion and an adverse impact on the actual interactive traffic flows.

Moreover, there are various other reasons why static MF classification, by itself, is insufficient. For example, the results of various analyses of Internet traffic classifications performed via MF classification processes, for example, reveals that up to 70% of Internet traffic data is typically classified as "unknown" (e.g., based on port-based classification). Such "unknown" classifications may be determined based on one or more of several conditions. Such conditions include, for example, the use by end user applications of: (1) ports other than well-known ports to circumvent access control restrictions; (2) ephemeral ports or use of well-known ports (e.g., HTTP/TCP port 80) by P2P applications; (3) dynamically allocated ports (e.g., FTP server port in passive FTP and SIP); (4) the same port by a single application to transmit traffic with different QoS requirements (e.g., port 1352 by lotus notes for both email and database transactions); (5) encryption of IP packet payloads; and (6) the same TCP connection to handle multiple objects (e.g., from a complex webpage) with different QoS requirements over the course of the TCP connection's lifetime.

According to a further exemplary embodiment, as an alternative or in addition to MF classification, a differentiated services (DS or DiffServ) classification process may be employed. Differentiated Services classification utilizes a Differentiated Services Field (DS field) in the IP header for classification of a packet. For example, with the IPv4 and IPv6 protocols, the DS field contains a 6-bit and 8-bit Differentiated Services Code Point (DSCP) value, respectively. DiffServ represents a coarse-grained mechanism for traffic classification that operates on a traffic class basis, as opposed to a finer-grained mechanism (e.g., integrated services or IntServ classification) that operates on a traffic flow basis (e.g., differentiating network traffic based on the requirements of an individual flow), for traffic classification and management. DiffServ operates based on a traffic class basis, where each data packet over a network is assigned to one of a predetermined set of traffic classes. Each traffic class can then be managed on a different priority-level basis, providing preferential treatment for higher-priority traffic over the network. By way of example, DiffServ includes a standardized set of traffic classes, but there are no preset rules as to how different types of traffic should be classified within the standard classes or the respective priority levels. DiffServ thereby provides a framework that facilitates classification and associated differentiated priority management. More specifically, DiffServ employs a process for classifying and marking packets based on the predetermined classes and classification rules for assigning particular data traffic types to respective classes. Based on that classification and marking, routers configured to support DiffServ classification implement packet forwarding properties (e.g., policies and priorities), on a per-hop basis, applied to a packet when traversing the network (Per-Hop Behaviors or PHBs).

The architecture of the DiffServ classification mechanism implements a model where traffic entering a network is classified (and possibly conditioned) at the boundaries of the network, and where each classification category is associated with particular packet forwarding properties. Each classification is identified by a single DSCP in the header of a packet. In accordance with DiffServ classification, a "Service" is generally defined as significant characteristics of packet transmission in one direction across a set of one or more paths within a network, where such characteristics may be specified in quantitative terms of throughput, delay, jitter and/or packet loss, or may otherwise be specified in terms of some relative priority of network resource access. The architecture of the DiffServ classification mechanism is thus composed of a number of functional elements implemented in network nodes, including per-hop forwarding behaviors, packet classification functions, and traffic conditioning functions (e.g., metering, marking, shaping and policing). Across one or more networks, packets may traverse multiple DiffServ domains, where each domain comprises a group of routers or portion(s) of the overall path that implement a common set of administratively defined DiffServ policies (e.g., a network or portion of a network under a common administrative entity). The DiffServ classification architecture provides for scalability by implementing the classification and conditioning functions only at network boundary nodes, and by applying per-hop policies to aggregates of traffic (e.g., on a packet basis as opposed to a traffic flow basis) based on the marking reflected by the DS field or DSCP in the IPv4 or IPv6 headers. Further, the Per-hop properties are defined to provide a reasonably granular means for allocating buffer and bandwidth resources at each node among competing traffic streams. Accordingly, per application flow or per-user forwarding states need not be maintained within the core of the network. Generally, a distinction is maintained between the service provided to a traffic aggregate, the applied conditioning functions and per-hop properties used to realize services, the DS field value or DSCP used to mark packets for application of respective per-hop properties, and the particular node implementation mechanisms that implement the per-hop properties. The DiffServ classification mechanism is further described in the Internet Engineering Task Force (IETF) publication IETF RFC2475, incorporated herein by reference in its entirety.

DiffServ classification, however, presents various difficulties and suffers from associated disadvantages, for example, with respect to the satisfaction of application-specific quality of service requirements. For one, predicting or controlling end-to-end packet forwarding properties is difficult (if not practically impossible), because the details of how individual routers address the DS field is configuration specific, which is further exacerbated where packets cross multiple DiffServ domains. Accordingly, it becomes virtually impossible provide for different classes of end-to-end connectivity on an application or per-user basis. In other words, DiffServ classification does not necessarily ensure quality of service or a specified service-level across overall data traffic paths. The classification of a packet via the DiffServ marking mechanism merely indicates a desired service treatment. Such a desired service treatment, however, is not guaranteed across all involved networks, but rather the policy treatment for data traffic may depend upon multiple service provider networks and the configuration of the respective routers within such networks to ensure that the policies will address the data packets in an appropriate fashion. Moreover, at a local node, a DSCP value may not be set in the headers of packets received from a local device/application, or, if set, the DSCP setting may not be an accurate or reliable setting. Accordingly, the local node would not be able to employ or rely on a DiffServ traffic classification.

Accordingly, in view of the disadvantages associated with the MF classification and DiffServ classification mechanisms, it becomes advantageous to employ further classification determinations (i.e., at subsequent stages of a traffic flow) to verify or further determine appropriate traffic classifications, during the pendency of the flow, as further information becomes available upon which more accurate classification determinations may be made.

Referring again to the exemplary embodiment of FIG. 3, after the initial first stage traffic classification, therefore, a further traffic classification determination is made (e.g., a second stage classification). At Step 305, the terminal node first monitors and evaluates a number (e.g., a predetermined number N) of the initial packets of the traffic flow (i.e., a second stage of the flow). The predetermined number N, for example, may be determined based on a number of packets generally transmitted by an application prior to settling into a data transfer phase (see discussion below regarding application data traffic classification based on packet size distribution). Further, the determination of the factor N may be based on a flexible set of configurable rules that can be set, where the configuration of such rules would be based on an analysis of the data traffic associated with the different applications or communications sessions targeted for classification. For example, the determined value may vary over time as a function of the typical data traffic of the different applications or communications sessions targeted for classification. Once the initial N packets of the flow are evaluated the terminal node determines whether to reclassify the traffic flow (Step 307), and, in the event that the evaluations dictate a different classification than initially applied, the terminal node will reclassify the traffic flow accordingly (Step 309). This further analysis and determination may be made, for example, based on one or more of a number of factors, based on information learned through such initial N packets (information that was unavailable at the start of the traffic flow). According to a further exemplary embodiment, as with the initial MF classification, where there are multiple hops prior to an initial packet reaching an aggregation node with DPI capabilities (described in further detail below), the routers or other devices at the intermediary nodes may perform their own second stage classification based on the same classification rules deployed at the initial terminal node (based on an evaluation of the same factors with respect to the first N packets as with the initial terminal node). Alternatively, the initial terminal node may communicate its second stage classification assignment (or reclassification) to such other intermediary nodes. Accordingly, the initial packets would thus continue to receive consistent priority treatment based on the second stage classification. Similarly, with respect to traffic flows, associated with the same application or session, traveling in the opposite direction from the destination terminal node back to the originating terminal node, the destination terminal node (and any intermediate nodes) may perform a similar second stage classification process for the flow management of the return data flow.

According to one exemplary embodiment, one such factor for a second stage traffic classification process may be packet size. The classification of a traffic flow based on packet size operates based on the characterization of application protocols based on known typical packet sizes employed by the respective data protocols. For example, studies have been done using statistical methods of classification, whereby the statistics are based upon packet sizes—See, e.g., "Application Classification Using Packet Size Distribution and Port Association," Ying-Dar Lin, Chun-Nan Lu, Yuan-Cheng Lai, Wei-Hao Peng, and Po-Ching Lin, Journal of Network and Computer Applications, Vol. 32, Pp. 1023-1030 (2009). Each application protocol tends to employ one of some X distinct packet sizes, and most protocols typically settle into a data transfer phase using only a one of the N packet size options, semi-statically. For each application protocol, the X packet sizes, and the data transfer phase packet size can be predetermined via offline analysis. In the case of UDP packets of a small size, for example, an assumption may be made that the packets reflect voice or gaming packets. Moreover, a further scenario may be where a voice-over-IP (VoIP) application, running on an end user host may initially send control information across a TCP connection (resulting in one initial classification based on the packet size or port identifier), and subsequently use the same TCP connection to transmit and receive audio media (voice) packets as part of a VoIP call (which would result in a different classification or reclassification based on the packet size after the first N packets). In such a case, reclassification based on data packet size becomes an effective mechanism for reclassification of the packet flow, for example, after the first N packets.

According to an exemplary embodiment, a measure of flexibility is required in order to express the criteria of a packet flow that would trigger a re-classification from an initially classified priority (e.g., an interactive or high priority classification) to some lower priority. In order to facilitate such flexibility, two separate types of expressions are considered. The first being a Packet Size expression representing characteristics associated with the packet size, and the second being a Start of Packet Flow expression signifying the point of the beginning of a packet flow as to when to start evaluating based on the packet size expression. Two mathematical and Boolean operators for specifying the Packet Size expression, for example, would be elementary operators against packet sizes (e.g., greater than, less than and equal to). Additional operators may include expressions, such as comparison or negative comparison against ranges (e.g., less than, greater than or within a predetermined range, or not within range X, or not equal to), and use of Booleans when creating compound expressions (e.g., expression 1 AND expression 2). Additionally, according to a further exemplary embodiment, support for considering the Packet Size expression along with the protocol field is provided. Further, the following reflect operators for specifying the Start of Packet Flow expression. For example, "within N" signifies that the current packet number relative to the start of the flow is less than packet number N, and "after N"

signifies that the current packet number relative to the start of the flow is greater than packet number N.

By way of example, the terminal and IPGW are configured with both the Start of Packet Flow expression and its associated Packet Size expression, followed by the traffic class or priority of the flow if these expressions are met. Together, such would comprise the re-classification rule, reflecting a format additional to the DPI format of re-classification rules The IPGW evaluates these expressions for flows in the outroute direction and if they are met, identifies the pre-existing flow state and updates the traffic class associated with the re-classification rule. The terminal evaluates these expressions for flows in the inroute direction and if they are met, identifies the pre-existing flow state and updates to the traffic class associated with the re-classification rule.

The following illustrates an implementation of an exemplary embodiment, based on offline traffic flow analyses regarding certain application protocols for which the traffic is classified as interactive priority under default MF classification rules. Of the application protocols examined, Skype has been found to be the only protocol for which interactive priority is actually desired, and analysis of voice over IP (VoIP) based Skype reveals the use of codecs having packet sizes of 40, 70 and 80 bytes in size. Further, such examination revealed that all other such application protocols are better suited with traffic classifications as streaming or background. Analysis of the streaming-type application protocols reveals that packet sizes reach 65 bytes or greater within 10 packets of the start of a flow. Analysis of background-type application protocols reveals that packet sizes may reach 1 kbyte or greater within 20 packets of the start of a flow.

Accordingly, two example expressions would be configured to reclassify traffic flows of such streaming-type and background-type protocols from an interactive priority classification to either streaming or background classifications depending on the matching of the expression. According to one such expression, for example, if within 20 packets of a new TCP traffic flow the packet size becomes greater than 1 kbyte, then the priority classification is set as background priority. According to the second such expression, if within 10 packets of a new TCP or UDP traffic flow the packet size becomes greater than 65 bytes AND is not equal to 70 bytes) AND is not equal to 80 bytes, then the priority classification is set as streaming priority. The expressions are given a specific precedence of evaluation. In this scenario, for example, the expressions for background-type application protocols are evaluated before the expressions for streaming-type application protocols. Further, in some instances precedence of expression evaluation can be applied to achieve certain system classification behavior where an application protocol type meets more than one expression.

According to further exemplary embodiments, other factors for second stage traffic classification processes comprise throughput (e.g., Mbps), pacing (e.g., packet inter arrival time), burstiness (e.g., large number of packets arriving in short timeframe followed by pause before next burst arrives). It should be noted, however, that applying too many of such factors to a second stage traffic classification at the terminal node, for example, increases processing requirements, potentially overlapping with the functions generally performed by a deep packet inspection device DPI can perform (even though none of the foregoing examples actually requires looking into the packets themselves).

Subsequently, once the traffic flow has reached a service provider node equipped with a deep packet inspection (DPI) device 211 (i.e., a third stage of the flow), such as a data center or gateway node (e.g., an IPGW), the gateway node can perform a deep packet inspection of the packets of the data flow. The gateway node performs the deep packet inspection, and generates information regarding the traffic class of the data packets of the traffic flow (Step 311). The classification information generated by the DPI device 211 may then be transmitted to the respective terminal node from which the traffic flow originated, and also to the respective destination node (Step 313). By way of example, traffic classifications determined by the DPI device 211 may be assigned according to respective DSCP values, preconfigured as between the aggregation node where the DPI device 211 is deployed (e.g., a gateway or IP gateway), and the local terminal nodes (which may be remote from the aggregation node) at the originating and terminating nodes of the traffic flows. More specifically, the terminal and gateway nodes of the network may be preconfigured with certain DSCP values being assigned to respective traffic classes, where each traffic class has an associated set of traffic handling properties for a specific priority or QoS level. Then, based on the DPI analysis of a DPI device, the DPI device would set the appropriate DSCP value within the respective packet headers, and, based on that DSCP value, the terminal nodes can reclassify the traffic flow, and apply the appropriate traffic handling properties accordingly.

By way of example, DPI classification is a common form of signature-based classification, where a signature is defined as a characteristic of the packet payload that can be used to classify the traffic type. With DPI classification, the payload typically refers to the transport protocol payload, such as TCP or UDP. By way of example, the most common form of DPI classification involves the semantics of the packet payload being based on some form of markup language (such as HTML or XML), where the semantics are analyzed based on algorithms that identify signatures associated with the specific applications (even when hidden by the use of a transport protocol that was intended for another use). The classification rules for such DPI processes comprise regular expressions, which serve as inputs to algorithms for searching for markup language patterns in the payload of a packet. The syntax of these regular expressions reflects sequences of textual patterns, based upon which logical AND/OR searches are performed, as well as searches for optional textual patterns.

For example, the following reflects an established regular expression for a DPI Classification algorithm for identification of Yahoo Messenger traffic: ^(ymsg|ypns|yhoo).?.?.?.?.?.?.? [lwt].*\xc0\x80, where all Yahoo Messenger commands start with ymsg, ypns or yhoo, the next seven or fewer bytes contain command length and version information that varies among packets (which are ignored based on the respective characters ".?.?.?.?.?.?.?", the next character is the letter l, w or t (where the l denotes "Yahoo service verify", the w denotes "encryption challenge command", and the t denotes "login command"), and the pattern ends with the ASCII letters c0 and 80 in the hexadecimal form because 0xC080 is the standard argument separator in hexadecimal notation. More generally, the following table denotes an example of the syntax for the regular expressions for such a DPI classification process that involves the semantics of the packet payload:

| SYNTAX | MEANING | EXAMPLE |
|---|---|---|
| ^ | Pattern to be matched at the start of the input. | ^AB denotes that the input starts with AB, whereas a pattern excluding the "^" character indicates that the characters can be matched anywhere within the input. |
| \| | An OR operator. | A\|B denotes the occurrence of either A or B. |
| . | Single character wildcard. | |
| ? | Quantifier denoting a character occurrence of one or fewer. | A? denotes the character string A or an empty string. |
| * | Quantifier denoting a character occurrence of zero or more. | A* denotes an arbitrary number of A's. |
| [97] | Repeat. | A[100] denotes a sequence of 100 A's. |
| [ ] | Class of characters. | [lwt] denotes the character l, w or t. |
| [^] | A NOT operator (anything but). | [^n] denotes any character except n. |

In order to develop the classification rules for DPI processes, network engineers analyze the nature of protocols, for example, that utilize markup language. Based on this analysis the engineers identify two characteristics: (1) whether a unique regular expression can be formulated to uniquely identify the application; and (2) whether there are elements in the network and protocol header fields that can be used repeatedly, once the DPI classification process is performed to classify the application traffic for subsequent packets within the same traffic flow for the purpose of mapping to a traffic class. Where such a regular expression can be formulated for a given application running in a network, and the associated MF classification fields can be identified, then a DPI classification rule would be provisioned for accurate classification of the given application to a traffic class based on the values of a set of respective MF classification fields. Then, once the flow is detected using DPI classification, all subsequent packets with matching MF classification fields could subsequently and straightforwardly be mapped according to the appropriate classification. Additionally, by examining fields in the transport header of packet payload, DPI flow classification processes may also involve the examination of sequences of events with respect to protocol packets deployed by a given application within a bi-directional flow.

According to exemplary embodiments, therefore, a DPI device, that supports bi-directional DPI flow classification, may be deployed at an aggregation point within a network, whereby classification occurs after examination of the first few packets of data flows within the network. Subsequent to a DPI analysis and associated classification determination, the DPI device 211 would mark all subsequent outroute packets (associated with the classified flow) with an appropriate pre-configured DSCP value set in the DS field of the packet headers.

Upon receipt of the classification information from the gateway node, the terminal node determines whether to reclassify the traffic flow (Step 315), and, in the event that the DPI information dictates a different classification than currently applied, the terminal node will reclassify the traffic flow accordingly (Step 317). For example, once a sufficient number of packets have reached a gateway node or other network node equipped with DPI devices, a deep packet inspection may be performed on the packets of the data flow. Then the results of the determination may be fed back to the terminal node from where the data flow originated. Accordingly, based on the deep packet inspection information received from the network node with the DPI device 211, the terminal node may reclassify the traffic flow accordingly. For example, utilizing signaling from an external aggregation node (e.g., IPGW) with DPI capability, a further traffic classification determination may be made.

Additionally, according to exemplary embodiments, the system 130 may incorporate acceleration features, such as a TCP Performance Enhancement Proxy (PEP) (e.g., TCP spoofing). By way of example, one or more of the STs 134a to 134n and one or more of the GWs 138a to 138n (either themselves or via the respective IPGWs) may employ a TCP PEP to carry TCP traffic across the network. By way of example, in the case where a TCP PEP is employed, the MF classification rules may also provide an indication that, if matched, informs the terminal or gateway node as to whether the flow is to be TCP spoofed, as well as providing the traffic classification (e.g., including PBP backbone priority) of the flow. Further, when determined as being subject to a TCP PEP (e.g., TCP spoofing or acceleration), packets on that TCP connection (in both directions) are considered part of the respective traffic classification/priority. In other words, the TCP spoofed traffic is classified together for both directions, whereas non-TCP spoofed traffic is classified independently for each direction.

Accordingly, the functionality associated with DPI flow reclassification may be applied in both accelerated (e.g., TCP spoofed) and non-accelerated scenarios. A first scenario, for example, may involve a data flow over a connection subject to a TCP PEP (e.g., a TCP spoofed connection), where there is a pre-existing classification state associated with the flow, and an IPGW and terminal associated with the flow are configured with a reclassification rule associated with a certain DSCP marking. When packets of the flow with matching DSCP markings are encountered (e.g., marked with the respective DSCP values by a DPI device 211 deployed at an aggregation node), the pre-existing classification state of the flow would be updated to the traffic class (priority) in accordance with the reclassification rule. In this case, the PEP endpoints (e.g., TCP spoofer(s)) would support the ability to have an accelerated TCP connection (e.g., spoofed connection) mapped to (and remapped to a potentially different) priority or traffic class. Further, the IPGW and the terminal would have the necessary information and mechanisms to map and remap accelerated TCP connections in the outroute and inroute directions, respectively. Accordingly, the priority of a data flow between the TCP PEP endpoints may be updated or modified in a manner that avoids any unnecessary retransmissions, loss or added latency.

Alternatively, a second scenario may involve a data flow over a connection that is not subject to PEP acceleration, where there is a pre-existing classification state associated with the flow, and an IPGW and terminal associated with the flow are configured with a reclassification rule associated with a certain DSCP marking. For packets associated with flow in the outroute direction, the IPGW would identify the pre-existing flow classification state and update the state to specify the traffic class in accordance with the reclassification rule associated with the respective DSCP marking. In order for the inroute packets associated with the same flow to be reclassified to the corresponding traffic class based on the DSCP markings, the terminal would inspect non-TCP spoofed packets on the outroute for DSCP markings corresponding to the reclassification rules with which it is configured. Once such packets are identified, the terminal would then search its flow state tables to identify the pre-existing inroute flow, and reverse the M-tuple associated with the DSCP markings (e.g., reserving the source/destination IP addresses as well as the port numbers). Once the terminal has identified the inroute flow state associated with the DSCP reclassification rule, the terminal would then update the traffic class associated with the DSCP value of the outroute packet.

Accordingly, the classification mechanisms at the different stages of a data traffic flow are utilized together to determine a best possible classification, based on information available at different points in time, in order to provide improved and more efficient quality of service performance and to satisfy quality of service requirements of different data traffic flows. A particular data traffic flow, therefore, may have its traffic classification changed multiple times during the lifetime of the flow. According to exemplary embodiments, the staged classification process, therefore, is generally employed as follows.

First, an initial classification is determined based on the first packet of a new data flow, such as, in one exemplary embodiment, via an MF classification process. At this point, it should be noted that, for certain protocols (e.g., TCP), information regarding the packet size is not yet available. Once the initial classification is determined, the packets are handled based on the respective properties associated with the assigned classification. Further, because the data packets of many applications can potentially trigger a default rule based on the MF classification process, the default rule may be associated with aggressive traffic handling properties (e.g., for a high QoS), or conservative traffic handling properties (e.g., for a lower QoS), depending upon factors such as the ability of the network to maintain aggressive traffic handling properties, where the first few packets of several flows may be simultaneously defaulted to a high priority QoS, and the sensitivity of key target applications with data being carried according to conservative traffic handling properties (e.g., providing a lower QoS) early in the data flow, before being able to correct the classifications based on further information.

Subsequently, at a second stage (after a predetermined number of N packets have passed) a further classification decision may be made based on the first N packets at the beginning of the flow. This further classification decision, in accordance with an exemplary embodiment, would be determined based on data packet sizes observed over those first N packets, where N reflects a predetermined number set at a value to enable the respective flows to settle into a relatively steady-state packet configuration, while also being set relatively early in a flow to promptly correct misclassifications assigned at the initial stage of the flow.

Then, at yet a subsequent stage of the traffic flow (a third stage), once signaling from a network node capable of further packet inspection (e.g., a deep packet inspection or DPI) becomes available, a reclassification may be implemented when appropriate. According to one exemplary embodiment, this third stage reclassification may be made based on a DS field or DSCP value provided by a DPI device 211 at an aggregation point in the network (e.g., at a gateway or IP gateway node). Accordingly, local nodes without DPI capabilities are able to effect such a reclassification without requiring the complexity and cost associated with a local deployment of DPI capabilities. Such a reclassification may upshift the classification of a data flow that requires a high priority QoS, but inadvertently has been classified at a low priority QoS traffic classification during the earlier stages; or may downshift the classification of a data flow that does not require a high priority QoS, but inadvertently has been classified at a high priority QoS traffic classification during the earlier stages.

Accordingly, the initial traffic classification (first stage), subsequent classification (second stage) and DPI (third stage) are combined in order to iteratively determine, and upshift or downshift (as may be appropriate) the traffic classifications and priority handling of a traffic flow, beginning at the initiation of the flow, and subsequently at points when certain additional information becomes available, while managing the traffic flow based on prior classifications.

Figure 4:
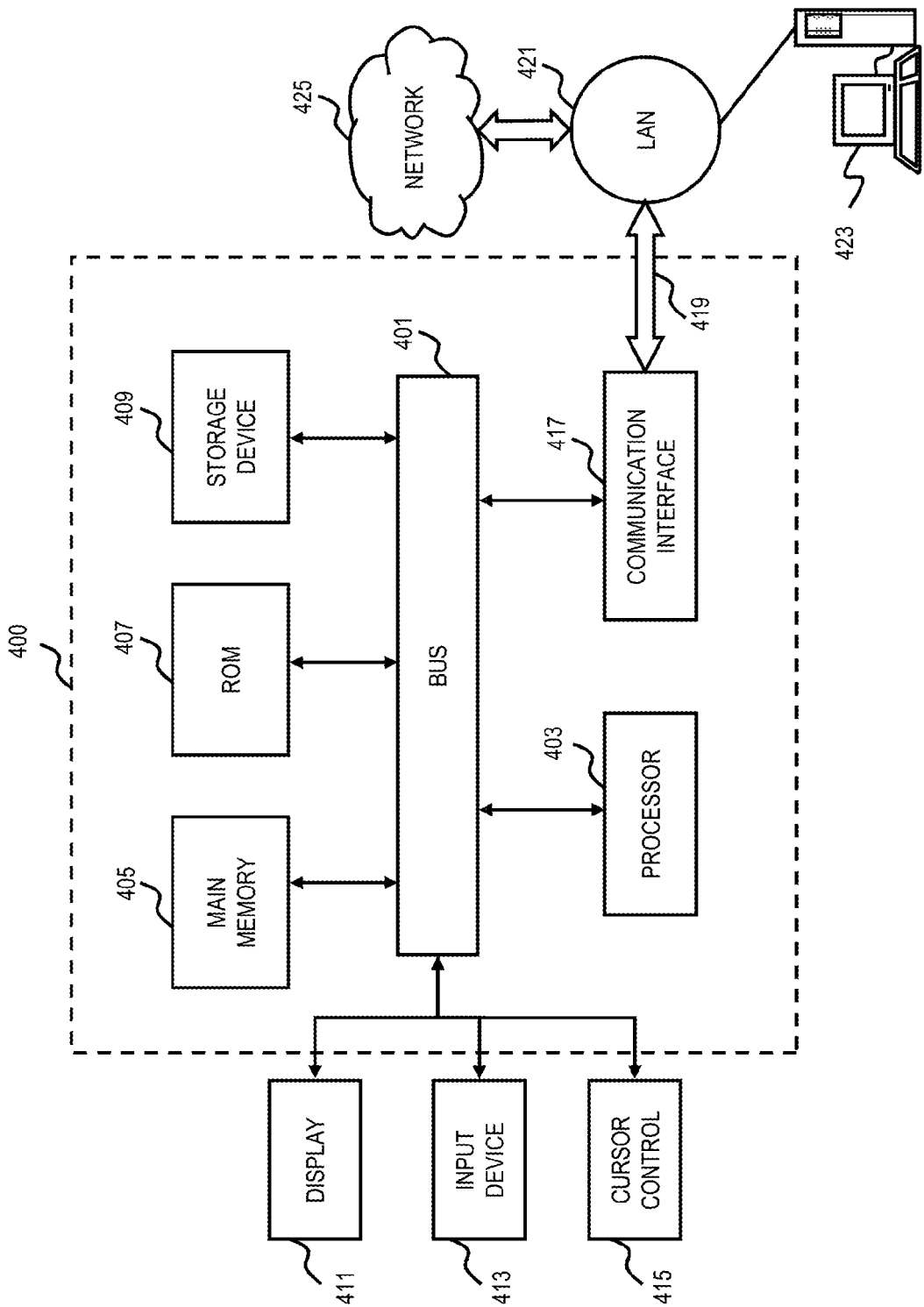
FIG. 4 illustrates a computer system upon which exemplary embodiments according to the present invention can be implemented.

FIG. 4 illustrates a computer system upon which exemplary embodiments according to the present invention can be implemented. The computer system 400 includes a bus 401 or other communication mechanism for communicating information, and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions to be executed by the processor 403. The computer system 400 further includes a read only memory (ROM) 407 or other static storage device coupled to the bus 401 for storing static information and instructions for the processor 403. A storage device 409, such as a magnetic disk or optical disk, is additionally coupled to the bus 401 for storing information and instructions.

The computer system 400 is coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is cursor control 415, such as a mouse, a trackball, or cursor direction keys for communicating direction information and command selections to the processor 403 and for controlling cursor movement on the display 411.

According to one embodiment of the invention, dynamic and flexible architectures and methods for association of remote nodes with respective aggregation nodes, in accordance with exemplary embodiments, are provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hardwired circuitry is used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, or a telephone modem to provide a data communication connection to a corresponding type of telephone line. As another example, communication interface 417 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417, for example, includes peripheral interface devices, such as a Universal Serial Bus (USB) interface, a PCMCIA (Personal Computer Memory Card International Association) interface, etc.

The network link 419 typically provides data communication through one or more networks to other data devices. For example, the network link 419 provides a connection through local network 421 to a host computer 423, which has connectivity to a network 425 (e.g. a wide area network (WAN) or the global packet data communication network now commonly referred to as the "Internet") or to data equipment operated by service provider. The local network 421 and network 425 both use electrical, electromagnetic, or optical signals to convey information and instructions. The signals through the various networks and the signals on network link 419 and through communication interface 417, which communicate digital data with computer system 400, are exemplary forms of carrier waves bearing the information and instructions.

The computer system 400 sends messages and receives data, including program code, through the network(s), network link 419, and communication interface 417. In the Internet example, a server (not shown) might transmit requested code belonging to an application program for implementing an embodiment of the present invention through the network 425, local network 421 and communication interface 417. The processor 403 executes the transmitted code while being received and/or store the code in storage device 239, or other non-volatile storage for later execution. In this manner, computer system 400 obtains application code in the form of a carrier wave.

The term "computer-readable medium" as used herein refers to any medium that participates in providing instructions to the processor 403 for execution. Such a medium may take many forms, including but not limited to non-volatile media, volatile media, and transmission media. Non-volatile media include, for example, optical or magnetic disks, such as storage device 409. Volatile media may include dynamic memory, such as main memory 405. Transmission media may include coaxial cables, copper wire and fiber optics, including the wires that comprise bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

FIG. 5 illustrates a chip set 500 in which embodiments of the invention may be implemented. Chip set 500 includes, for instance, processor and memory components described with respect to FIG. 5 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 500 includes a communication mechanism such as a bus 501 for passing information among the components of the chip set 500. A processor 503 has connectivity to the bus 501 to execute instructions and process information stored in, for example, a memory 505. The processor 503 includes one or more processing cores with each core configured to perform independently. A multi-core processor enables multiprocessing within a single physical package. Examples of a multi-core processor include two, four, eight, or greater numbers of processing cores. Alternatively or in addition, the processor 503 includes one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, and/or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 503 and accompanying components have connectivity to the memory 505 via the bus 501. The memory 505 includes both dynamic memory (e.g., RAM) and static memory (e.g., ROM) for storing executable instructions that, when executed by the processor 503 and/or the DSP 507 and/or the ASIC 509, perform the process of exemplary embodiments as described herein. The memory 505 also stores the data associated with or generated by the execution of the process.

While exemplary embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    assigning, by an initial client node of a data flow over a communications network, an initial traffic class as a current traffic classification of the data flow, wherein the initial client node is co-located with, or situated within a local network of, an application device from which the data flow originated, and wherein the initial traffic class is based on one or more static traffic classification methods applied with respect to one or more initial packets of the data flow;
    receiving, by the initial client node, traffic classification information regarding the data flow from a remote downstream node of the data flow, wherein the remote downstream node is remotely located from the initial client node in that it is not co-located with the initial client node and is not within a local network of the initial client node, and wherein the traffic classification information is based on a dynamic analysis of further data packets of the traffic flow by the downstream node, beyond the one or more initial packets upon which the initial traffic class was based; and
    updating, by the initial client node, the current traffic classification of the data flow based on the received traffic classification information, if the information indicates a different traffic class than the initial traffic class.

2. The method of claim 1, wherein the static traffic classification methods comprise one or more of a multi-field (MF) classification method and a differentiated services (DiffServ) traffic classification method.

3. The method of claim 1, wherein the traffic classification information is based on a deep packet inspection (DPI) analysis of the respective packets of the data flow.

4. The method of claim 1, further comprising the following steps performed prior to the receipt of the traffic classification information from the downstream node:
    analyzing, by the initial client node of the data flow, a number of subsequent packets of the data flow, based on one or more predetermined factors, and determining an intermediate traffic class based on the analysis of the number of further packets; and
    updating the current traffic classification of the data flow based on the determination of the intermediate traffic class, if the determined intermediate traffic class differs from the initial traffic class.

5. The method of claim 4, wherein, when the intermediate traffic class differs from the initial traffic class, the current traffic classification of the data flow is updated to the intermediate traffic class only if the intermediate traffic class reflects a higher priority classification as compared to the initial traffic class.

6. The method of claim 4, further comprising:
    determining whether the intermediate traffic class reflects a more accurate classification as compared to the initial traffic class; and
    wherein the current traffic classification of the data flow is updated to the intermediate traffic class only if it is determined that the intermediate traffic class reflects a more accurate classification as compared to the initial traffic class.

7. The method of claim 4, wherein the one or more predetermined factors comprise one or more of packet size, port association, throughput, pacing, and burstiness.

8. The method of claim 4, wherein the one or more predetermined factors comprises packet size.

9. The method of claim 8, wherein the analysis of the subsequent packets is based on a statistical analysis of data packet sizes with respect to one or more application protocols.

10. The method of claim 4, wherein a start of packet flow indicator identifies a packet within the data flow from which the analysis of the subsequent packets is to begin.

11. The method of claim 4, wherein the number of subsequent packets is based on a flexible set of configurable rules based on one or more of host applications and communications sessions targeted for classification.

12. An apparatus of an initial client node of a data flow over a communications network, comprising:
    a data traffic processor, operating at the initial client node, configured to analyze one or more initial packets of the data flow based on one or more static traffic classification methods, and to assign an initial traffic class as a current traffic classification of the data flow based on the one or more static traffic classification methods applied with respect to the one or more initial packets of the data flow, wherein the initial client node is co-located with, or situated within a local network of, an application device from which the data flow originated; and
    wherein the data traffic processor is further configured to receive, from a remote downstream node of the data flow, traffic classification information regarding the data flow, wherein the remote downstream node is remotely located from the initial client node in that it is not co-located with the initial client node and is not within a local network of the initial client node, and wherein the traffic classification information is based on a dynamic analysis of respective further data packets of the traffic flow by the downstream node, beyond the one or more initial packets upon which the initial traffic class was based, and to update the current traffic classification of the data flow based on the received traffic classification information, if the information indicates a different traffic class than the initial traffic class.

13. The apparatus of claim 12, wherein the static traffic classification methods comprise one or more of a multi-field (MF) classification method and a differentiated services (DiffServ) traffic classification method.

14. The apparatus of claim 12, wherein the traffic classification information is based on a deep packet inspection (DPI) analysis of the respective packets of the data flow.

15. The apparatus of claim 12, wherein the data traffic processor is further configured to perform the following functions prior to the receipt of the traffic classification information from the downstream node:

analyze a number of subsequent packets of the data flow, based on one or more predetermined factors, and determine an intermediate traffic class based on the analysis of the number of further packets; and update the current traffic classification of the data flow based on the determination of the intermediate traffic class, if the determined intermediate traffic class differs from the initial traffic class.

16. The apparatus of claim 15, wherein, when the intermediate traffic class differs from the initial traffic class, data traffic processor is configured to update the current traffic classification of the data flow to the intermediate traffic class only if the intermediate traffic class reflects a higher priority classification as compared to the initial traffic class.

17. The apparatus of claim 15, wherein the data traffic processor is further configured to:

determine whether the intermediate traffic class reflects a more accurate classification as compared to the initial traffic class; and update the current traffic classification of the data flow to the intermediate traffic class only if it determines that the intermediate traffic class reflects a more accurate classification as compared to the initial traffic class.

18. The apparatus of claim 15, wherein the one or more predetermined factors comprise one or more of packet size, port association, throughput, pacing, and burstiness.

19. The apparatus of claim 15, wherein the one or more predetermined factors comprises packet size.

20. The apparatus of claim 19, wherein the analysis of the subsequent packets is based on a statistical analysis of data packet sizes with respect to one or more application protocols.

21. The apparatus of claim 15, wherein a start of packet flow indicator identifies a packet within the data flow from which the analysis of the subsequent packets is to begin.

22. The apparatus of claim 15, wherein the number of subsequent packets is based on a flexible set of configurable rules based on one or more of host applications and communications sessions targeted for classification.

* * * * *